United States Patent [19]

Ebersohl

[11] Patent Number: 5,374,922
[45] Date of Patent: Dec. 20, 1994

[54] DEVICE FOR DETERMINING THE STATE OF AN APPARATUS, AND IN PARTICULAR THE OPEN OR CLOSED STATE OF AN ELECTRICAL APPARATUS BY MEANS OF AUXILIARY CONTACTS

[75] Inventor: Gérard Ebersohl, La Mulatiere, France

[73] Assignee: GEC Alsthom SA, Paris, France

[21] Appl. No.: 960,710

[22] Filed: Oct. 14, 1992

[30] Foreign Application Priority Data

Oct. 15, 1991 [FR] France .................. 91 12675

[51] Int. Cl.$^5$ .............................. G08B 21/00
[52] U.S. Cl. ...................... 340/644; 340/635
[58] Field of Search ............ 340/644, 635, 500; 324/424; 361/59

[56] References Cited

U.S. PATENT DOCUMENTS 4,956,637 9/1990 Vogt ....................... 340/644

FOREIGN PATENT DOCUMENTS 2004735 11/1969 France .
2217846 9/1974 France .
2536903 6/1984 France .
2711416 8/1978 Germany .
269040 6/1989 Germany .
3941319 6/1991 Germany .

Primary Examiner—Jeffery A. Hofsass
Attorney, Agent, or Firm—Sughrue, Mion, Zinn, Macpeak & Seas

[57] ABSTRACT

A device for determining the state of an apparatus capable of existing in a first state and a second state. The apparatus is provided with auxiliary contacts (CAO1, ..., CAF1, ...) which provide binary state signals that depend on the current state of the apparatus. The device includes at least one first state auxiliary contact CAO1), that provides a "1" state signal when the apparatus is in its first state, and at least one second state auxiliary contact CAS1) providing a "1" state signal when the apparatus is in its second state. The device also has a programmed microcontroller (MP) having inputs on which it receives the state signals from the auxiliary contacts (CAO1, ..., CAF1, ...) and also instructions (OO, OF) requesting the apparatus to switch from one state to the other. In particular, the programmed microcontroller provides output signals representative of the state (PO, PF) and/or of the availability (MFP) of the apparatus, and of the state and/or the availability (MACAO, MACAF, MFCA) of the auxiliary contacts. The output signals are generated by a program that implements a strategy for continuity of service and safety of utilization for the apparatus.

13 Claims, 2 Drawing Sheets

DEVICE FOR DETERMINING THE STATE OF AN APPARATUS, AND IN PARTICULAR THE OPEN OR CLOSED STATE OF AN ELECTRICAL APPARATUS BY MEANS OF AUXILIARY CONTACTS

BACKGROUND OF THE INVENTION

1. Field of the Invention

The present invention relates to a device enabling the state of an apparatus to be determined, and in particular the open or closed state of an electrical cut-out apparatus such as a circuit breaker or a section switch, with the state being determined by means of auxiliary contacts.

2. Description of the Prior Art

It is recalled that an auxiliary contact is a device which, when used with a cut-out apparatus, includes an element that is linked to the movable portion of the cut-out apparatus and that provides a signal which depends on the position of said movable portion. This signal may be a binary signal, e.g. "1" when the apparatus is "in position" (open or closed), and "0" when the apparatus leaves its position. It is also known that auxiliary contacts can be used for suitably driving coils for controlling the opening and the closing of the electrical cut-out apparatus.

The use of an auxiliary contact for remotely determining the position of a circuit breaker can include the risk of error. An auxiliary contact is a device that may decay: it does little, and its metal contacts may become covered in a layer of oxide. Under such circumstances, the auxiliary contact can provide a wrong signal and can lead to a decision being taken to open a section switch when a circuit breaker that is believed to be open is in fact still closed.

Attempts have therefore been made to improve the operating safety of auxiliary contacts by using redundancy.

For example, two auxiliary contacts are installed instead of one, and the signal provided by each of them is received by an OR type circuit, such that the signal taken into account is that given by the output from the OR circuit.

It is observed that when indicating that the apparatus is "in position", it suffices that one or other of the two auxiliary contacts still gives a "1". If P is the probability of a breakdown in a signal contact, the probability of giving a wrong "in position" signal is P×P. To indicate that the apparatus is "out of position", the two auxiliary contacts must both give a "0" signal, thus the probability of giving a wrong "out of position" signal becomes 2P.

It can thus be seen that passive redundancy using two auxiliary contacts does not give the same results for the two signals expected from the auxiliary contact, and, finally, this technique does not solve the problem posed.

Proposals have been made to use passive redundancy with three auxiliary contacts and with a two-out-of-three majority decision being taken.

To give a "in position" signal, it suffices that two of the auxiliary contacts should be giving a "1" signal. The acceptable combinations for transmitting a "in position" are thus:
1 1 1
1 0 1
0 1 1
1 1 0

To give a "out of position" signal, it suffices that two of the auxiliary contacts should be giving a "0" signal. Acceptable combinations for transmitting a "out of position" signal are thus as follows:
0 0 0
0 0 1
1 0 0
0 1 0

Since the probability of two auxiliary contacts failing simultaneously is P×P, the same reliability is obtained for the "in position" signal as for the "out of position" signal, namely P×P, however this applies so long as only one of the auxiliary contacts is faulty.

In contrast, in the event of a second breakdown, assuming that a first breakdown has not been repaired in the meanwhile, erroneous conclusions may be deduced. For example, if two auxiliary contacts are stuck in the "1" position, then:
- when "in position" the reading will be 111, and that is correct; but
- when "out of position", the reading will be 110, and that is incorrect since a two-out-of-three majority decision will give rise to a "in position" signal being understood.

It can be seen that the above-described passive redundancy greatly improves the availability of signalling, but that it does this in a manner that is often unsatisfactory given the robustness targets set for the system in the event of multiple breakdowns.

The problem thus remains of monitoring electrical apparatuses remotely and of being able to rely on the signals delivered by auxiliary contacts so as to be able to take operating decisions for a grid without taking risks.

An object of the invention is thus to define a device for determining the position of an apparatus by using auxiliary contacts and making it possible to provide signals that are reliable even when some of the auxiliary contacts are faulty. Under some operating conditions of a grid, e.g. under extreme climatic conditions, it is not always possible to repair an auxiliary contact that has become faulty. It is nevertheless essential to be able to discover the position of the apparatus without risk of error. The device must also ensure proper control of the actuators of the apparatus.

Another object of the invention is to define a device that is capable of providing signals enabling it to diagnose itself, in particular signals specifying the good or faulty state of the auxiliary contacts in the apparatus. The availability of the apparatus is thus increased by enabling maintenance to be performed thereon in knowledge of the facts.

Another object of the invention is to define a device making it possible to improve knowledge about the electrical apparatus used while it is being used, for example if the apparatus is a circuit breaker, making it possible to learn how long it takes to operate. One such duration may be the time that elapses between the beginning of an instruction being given to the circuit breaker and the circuit breaker moving from its starting position. Another duration may be the time that elapses between starting from a given position and arriving in the opposite position. Knowledge of such operating times makes it possible to improve maintenance of the apparatus and to forestall major breakdowns.

SUMMARY OF THE INVENTION

The present invention provides a device for determining the state of apparatus capable of taking up a first state and a second state, the apparatus being provided with auxiliary contacts providing binary state signals depending on the current state of the apparatus, the device being characterized in that it comprises at least one "first state" auxiliary contact providing a "1" state when the apparatus is in its first state, and at least one "second state" auxiliary contact providing a "1" state signal when the apparatus is in its second state, and a programmed microcontroller receiving the state signals from the auxiliary contacts on inputs thereof, and also receiving instructions requesting the apparatus to switch from one state to the other, and providing an output signal representative of the state and/or of the availability of the apparatus, said signal being generated by a program for implementing a strategy for obtaining continuity of service and utilization safety for the apparatus, the software relying on the following conditions:

if an auxiliary contact changes state without a state changing instruction being issued by the microcontroller, then the microcontroller considers that the auxiliary contact is faulty and no longer takes its signals into account; and if after a change of state instruction has been issued by the microcontroller an auxiliary contact does not change state in a given time delay, then the microcontroller considers it to be faulty and does not take signals from it into account;

the software also taking account of the states of good auxiliary contacts as they appear at the instant when a change of state instruction is issued, and the change of state instruction itself.

The invention is applicable to heavy current applications and in a particular embodiment, it provides a device for determining the position of an electrical cut-out apparatus such as a circuit breaker or a section switch having one pole per phase, and including for each of said poles auxiliary contacts that provide digital binary signals, namely a "1" signal when the auxiliary contact is in a position that corresponds to the apparatus being in an open state or in a closed state, and a "0" signal when the auxiliary contact leaves its position, said pole being driven via an open coil and a close coil, the device being characterized in that for each pole it comprises a first group and a second group each of n auxiliary contacts, where B is an integer of not less than 2, the "open auxiliary contacts" (CAO1, CAO2, CAO3) of the first group providing a "1" signal when they detect the apparatus to be in an open position, the "closed auxiliary contacts" (CAF1, CAF2, CAF3) of the second group providing a "1" signal when they detect the apparatus to be in a closed position, the said auxiliary contacts being connected to a programmed microprocessor (MP) that also receives a signal (OO) corresponding to an open instruction for the apparatus, and a signal (OF) corresponding to a close instruction for the apparatus, said microprocessor having an output (CDO) for controlling the open coil of the pole, an output (CDF) for controlling the close coil of the pole, an output (PF) providing an "apparatus closed" signal, an output (PO) for providing an "apparatus open" signal, outputs (MACAO, MACAF) for providing signals concerning the availability of the auxiliary contacts in the first and second groups, an output (MFCA) for providing a signal indicating a major fault in one of the auxiliary contact groups, and an output (MFP) for providing a signal indicating a major failure of the pole, the strategy of the program being established so that:

an auxiliary contact which does not change state within a given time delay following an open or a close instruction is considered as being faulty and is no longer taken into consideration by the program;

an apparatus is declared to be opened at the end of an open sequence if one of the following situations occurs at the end of said opening sequence:

all n closed auxiliary contacts and all n open auxiliary contacts are good and have changed state appropriately, with open auxiliary contacts changing from "1" to "0", and closed auxiliary contacts changing from "0" to "1";

at least one closed auxiliary contact is good and at least one open auxiliary contact has changed state appropriately;

all n good open auxiliary contacts have changed state while the n closed auxiliary contacts are all faulty (a major auxiliary contact failure corresponding to a signal MCFA=1 being issued); and all n good closed auxiliary contacts have changed state while the n open auxiliary contacts are all faulty (a major auxiliary contact failure corresponding to a signal MCFA=1 being issued);

an apparatus is declared to be closed at the end of the close sequence if one of the following circumstances arises at the end of said closed sequence:

at least one good open auxiliary contact has changed state in the event of all of the closed auxiliary contacts failing during the operation; and at least one good closed auxiliary contact has changed state in the event of all of the open auxiliary contacts failing during the operation;

the program also being organized so that:

a group of contacts is declared faulty (a major auxiliary contact group failure corresponding to an MFCA=1 signal) if none of the auxiliary contacts of the group has changed state during a first time delay (TIME0) following an instruction to open or close the apparatus, and while during the same time lapse an appropriate change is observed for the auxiliary contacts of the other group; and an auxiliary contact is declared faulty if it has not changed state at the end of a second time delay (TIME1), initiated by another auxiliary contact of the same group changing state appropriately during an open sequence or a close sequence of the apparatus.

Advantageously, the auxiliary contacts are provided with self-diagnosis means and provide signals (ADO1, ADO2, ADO3, ADF1, ADF2, ADF3) addressed to inputs of the microcontroller.

Advantageously, the program is organized so that in the standby state, an "apparatus open" signal is given when one of the following circumstances arises: the n open auxiliary contacts are good and in the "1" state and the n closed auxiliary contacts are good and in the "0" state; at least one open auxiliary contact is good and in the "1" state and at least one closed auxiliary contact is good and in the "0" state;

the n open auxiliary contacts are good and in the "1" state if all of the closed auxiliary contacts are faulty; and the n closed auxiliary contacts are good and in the "0" state if all the closed auxiliary contacts are faulty.

In the same manner, the program is organized so that in the standby state, an "apparatus closed" signal is issued so long as one of the following circumstances is present:

at least one closed auxiliary contact is good and in the "1" state; and at least one of the open auxiliary contacts is good and in the "0" state.

The program is organized to lock the apparatus in the "apparatus open" position and to issue an "apparatus faulty" signal whenever the state of the auxiliary contacts corresponds to none of the circumstances allowing it to issue an "apparatus open" signal.

In the same manner, the program is organized to lock the apparatus in an "apparatus closed" position and to issue a "apparatus faulty" signal whenever the state of the auxiliary contacts corresponds to none of the circumstances enabling it to issue an "apparatus closed" signal.

The program is organized in such a manner that:

when an open or a close instruction (OO, OF) is given at time origin (t0), a first surveillance time window having a first duration (TIME0) is initiated by a first time delay (TEMPO1), and simultaneously a first timer (CHRO0) is started;

when the first of the auxiliary contacts of a first group changes state (an open auxiliary contact for an open instruction or a closed auxiliary contact for a close instruction) at an instant t1, a second time window having a second duration (TIME1) is opened by means of a second time delay (TEMPO1) and simultaneously the first timer (CHRO0) is stopped, the time it provides is stored in memory, which time corresponds to the starting time from rest, and a second timer (CHR1) is started;

at the end of the second time duration (TIME1), at instant t2, the auxiliary contacts of said first group have had the chance to change state, and the resulting states thereof are stored in order to be analyzed;

when the first signal contact of the second group changes state at instant t3, said second time window of the second duration (TIME1) is started again using said second time delay (TEMPO1) and simultaneously the second timer (CHR1) is stopped and the time it provides is stored and is suitable for use in determining the mean speed of the contacts of the equipment;

when the second time delay expires (TIME1), all of the good auxiliary contacts in the second group will have changed state, and the resulting states are stored in order to be analyzed;

an auxiliary contact in the first group or in the second group is declared to be faulty if it has not changed state at the end of the second time window (TIME1) relating thereto; and a group of auxiliary contacts is declared to be suffering from a major fault if none of the auxiliary contacts in the group has changed state by the end of the first time window (TIME0) when an appropriate change of state has been observed in the opposite group.

The program includes a first fault mode subprogram (fault mode 1), which:

during an apparatus opening process, after observing that the sequence has been initiated by a change in the state of a closed auxiliary contact and that none of the open auxiliary contacts has changed state at the end of the first time window (TIME0), causes an apparatus fault signal (MFP=1) to appear;

during an apparatus opening process, after observing that the sequence has not been initiated because none of the closed auxiliary contacts has changed state at the end of the first time window, causes an "apparatus open" signal (PO=1) to appear if all three open auxiliary contacts have not changed state, and simultaneously issues a major fault signal concerning the closed auxiliary contacts (MACAF=1, MFCA=1);

during an apparatus opening process, after observing that the sequence has not been initiated because none of the closed auxiliary contacts has changed state at the end of the first time window, and having observed no change of state in the good open auxiliary contacts, causes an apparatus failure signal (MFP=1) to appear and locks out any subsequent instruction;

during an apparatus closing process, after observing that the sequence has been initiated by an open auxiliary contact changing state and observing that none of the closed auxiliary contacts has changed state at the end of the first time window (TIME0), causes an "apparatus closed" signal to appear, with the second duration being taken to be equal to the duration of the first time window (TIME0);

during an apparatus closing process, after observing a major fault of the closed auxiliary contacts, causes an "apparatus closed" signal to appear if one of the open auxiliary contacts changes state;

during an apparatus closing process, after observing a major fault of the closed auxiliary contacts, and after observing that none of the good open auxiliary contacts has changed state, declares the apparatus to be faulty, takes the first duration (T1) to be equal to the duration of the first time window (TIME0), takes the second duration (T2) to be equal to the maximum capacity of said third timer (FFFF), and causes a third fault mode program (fault mode 3) to be run.

The program includes a second fault mode subprogram (fault mode 2) for determining the position of the apparatus in its standby state when all of the open auxiliary contacts and/or all of the closed auxiliary contacts are faulty, said second subprogram being organized so that:

the last recorded given instruction being an open instruction, the device confirms the "apparatus open" state only if at least all of the auxiliary contacts in one of the groups are good;

the last recorded given instruction being a close instruction, the device indicates that the apparatus is closed if at least one good closed auxiliary contact is in the "1" state or if at least one good open auxiliary contact is in the "0" state; and if all of the open auxiliary contacts and all of the closed auxiliary contacts are faulty, the device indicates that the apparatus is faulty and prevents any subsequent operation thereof.

The program includes a third fault mode subprogram (fault mode 3) for detecting faults of the apparatus and for locking out all subsequent instructions, and for issuing a "apparatus faulty" signal.

In a particular embodiment of the invention, the number n of auxiliary contacts in each group is equal to 3.

BRIEF DESCRIPTION OF THE DRAWINGS

The invention is now described in detail with reference to an embodiment given with reference to the accompanying drawings, in which.

DETAILED DESCRIPTION OF THE PREFERRED EMBODIMENT

Figure 1:
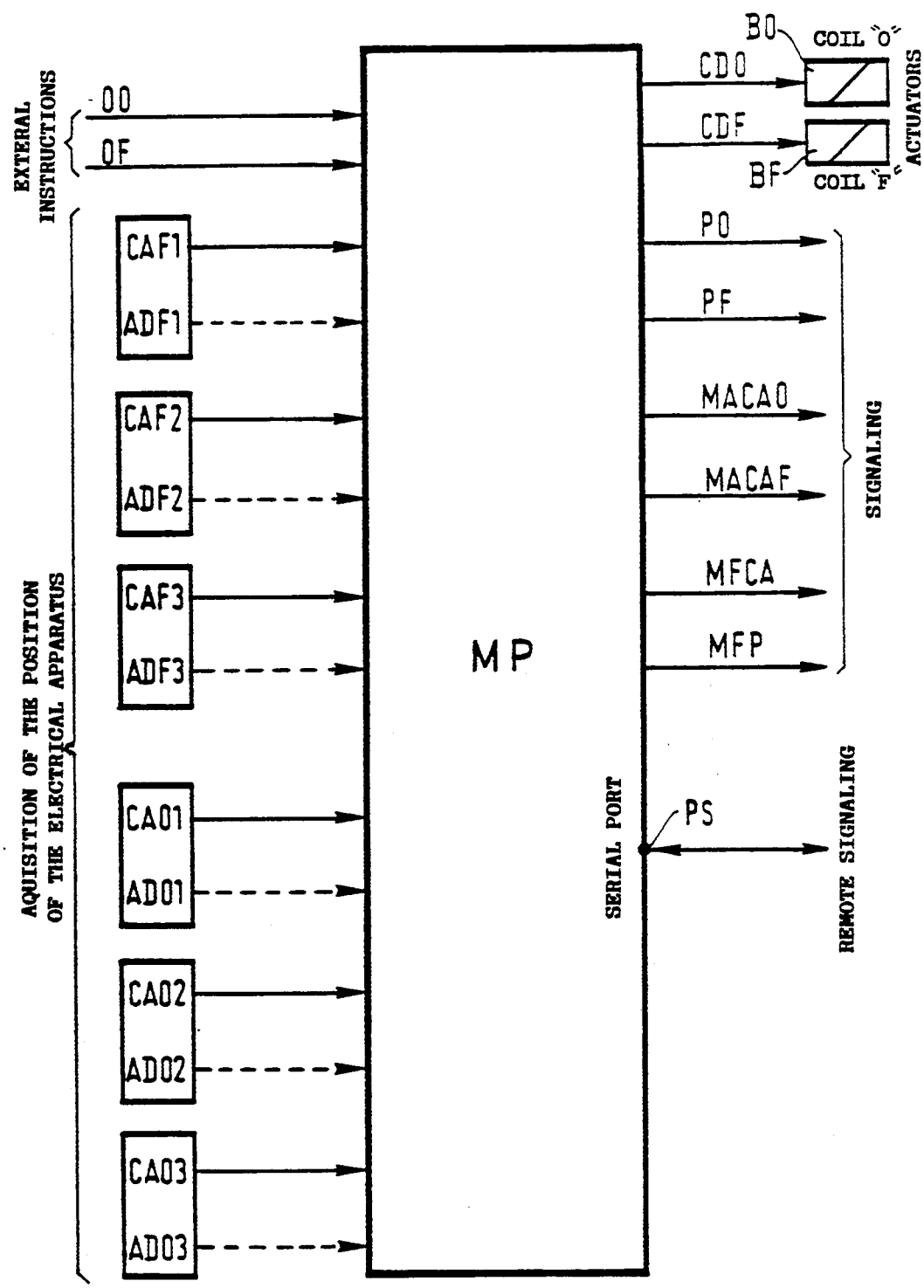
FIG. 1 is a block diagram of the device of the invention and applied to detecting the open or closed state of one pole of an electrical cut-out apparatus such as a circuit breaker.

In the example given, reference is made to monitoring the state of one pole of a high tension circuit breaker. In the usual case of a three-phase circuit breaker, the device described below will naturally need to be provided three times over, once for each of the poles of the circuit breaker.

In the example chosen, the number n of auxiliary contacts per group has been chosen to be equal to 3.

The device of the invention is built around a microcontroller MP, e.g. an INTEL type 80C31 circuit.

The microprocessor MP receives signals from a first group of auxiliary contacts CAO1, CAO2, and CAO3 placed in the vicinity of the pole and each, when good, providing a "1" signal when the pole is in its open position and a "0" signal when the pole leaves its open position. The term "state word" of the group of open auxiliary contacts (abbreviated below to "CAO" group), is used to designate the number sequence corresponding to the signals provided by the group. Thus the CAO group state word is 111 when all of the auxiliary contacts in the group are good and the pole is open.

The microcontroller also receives (preferably but optionally) signals ADO1, ADO2, and ADO3 relating to self-diagnosis performed by the open auxiliary contacts CAO1, CAO2, and CAO3 respectively. Each of these signals is, for example, a binary "1" signal when the auxiliary contact judges itself to be good, and a binary "0" signal when it judges itself to be faulty.

The microprocessor MP also receives signals from a second group of auxiliary contacts CAF1, CAF2, and CAF3 placed in the vicinity of the pole and each, ,when good, providing a "1" signal when the pole is closed and a "0" signal when the pole abandons said position. The state word of this second group (abbreviated below to "CAF" group) is thus 111 when all of the closed auxiliary contacts are good and the pole is closed.

The microcontroller also receives self-diagnosis signals ADF1, ADF2, and ADF3 for the CAFs if it is designed to receive self-diagnosis signals for the CAOs.

The microprocessor MP has an input for receiving a signal OO corresponding to an instruction to open the pole, and on another input it receives a signal OF corresponding to an instruction to close the pole.

On two outputs, the microprocessor provides signals PO and PF respectively indicating that the pole is open and that the pole is closed, which signals are generated by applying the program contained in the microprocessor. In addition, it delivers instructions CDO and CDF respectively to the open coils BO and to the close coils BF of the pole, signals MACAO and MACAF relating to maximum availability of the CAOs and of the CAFs respectively, a signal MCFA relating to a major breakdown of a group of auxiliary contacts, and a signal MFP indicating a major breakdown of the pole. The microprocessor also processes a serial port PS for remote signalling with the environment of the station in which the cut-out apparatus is located.

The principle on which the operating program of the device is based is described below.

The operating program of the microprocessor is designed to provide reliable signals about the open or closed state of the pole, even if some of the CAOs or the CAFs are faulty. This is called fault operation and it makes it possible to obtain reliable signals about the state of the pole while waiting for the faulty CAOs or CAFs to be repaired. The principles used are the following:

- at any instant, the most recent accurate position of the pole is known, since it is stored, as are the instructions OO and OF;
- each time a data bit OO, OF, CAO, or CAF is acquired, as is done periodically, e.g. once every millisecond by means of an interrupt subprogram using a real time clock of the micro-controller, it is possible to establish whether the pole is open or closed, assuming that the pole is in a standby state;
- if, while the pole is in its standby state, an auxiliary contact changes state, then that contact is declared faulty and the program will not take it into account subsequently; and
- if an open or a close instruction is given for the pole, then a time delay is started: if one of the auxiliary contacts changes state before the time delay time elapses, it is deduced that the auxiliary contact has switched from its previous rest position to its out-of-position position. A short time delay is then started in order to allow the other auxiliary contacts of the same group to take up their final states. Their states are recorded in a status mask, with each group of auxiliary contacts (abbreviated below as "CA") having its own mask. When all of the CAs are good, these masks are 111 for the CAO status mask and 111 for the CAF status mask. The MACAO and MACAF outputs of the microcontroller are then in the "1" state. Each time the CAs are acquired, their state words (assuming they were believed to be closed) or the complements thereof (assuming they were believed to be open) are subjected to a logical AND together with their status masks, such that only valid CAs are used for determining position and for determining the expected transitions. It is thus the valid CAs that are referred to below in this text.

An open pole is declared to be in the standby state in the following circumstances:

- all three CAOs are good and equal to "1", and all three CAFs are good and equal to "0";
- at least one CAO is good and equal to "1", and at least one CAF is good and equal to "0";
- all three CAFs are good and equal to "0", if all of the CAOs are faulty; and
- all three CAOs are good and equal to "1", if all of the CAFs are faulty.

Under any other circumstances, the pole is declared to be neither open nor closed, but faulty and it is locked in position.

A pole is declared to be in the standby state if it has at least one good CAF in the "1" state or at least one good CAO in the "0" state. Under other circumstances, the pole is said to be neither open nor closed, but faulty and it is locked in position.

In a pole-opening operation, a "pole open" signal is given only at the end of the sequence and in one of the following circumstances:
- all three CAFs are good and have switched from "1" to "0";
- at least one CAF is good and has switched from "1" to "0" and a good CAO has switched from "0" to "1";
- all three CAOs are good and have switched from "0" to "1" even though a major fault has occurred on all three CAFs; and
- all three CAFs are good and have switched from 37 1" to "0" even though a major fault has occurred on all three CAOs.

For a pole-closing operation, a "pole closed" signal is given only at the end of the sequence and in the following circumstances:
- a good CAO has switched from "1" to "0" in the event of a major failure affecting all three CAFs in the course of the operation;
- a good CAF has switched from "0" to "1" in the event of a major failure of all three CAOs during the operation.

It may be observed that the fault operation conditions are more severe for confirming an open position than a closed position, which will readily be understood for reasons of safety. In addition, the pole-closed signal is more easily verified than the pole-open signal because current and voltage are present that can be detected by other means.

Figure 2:
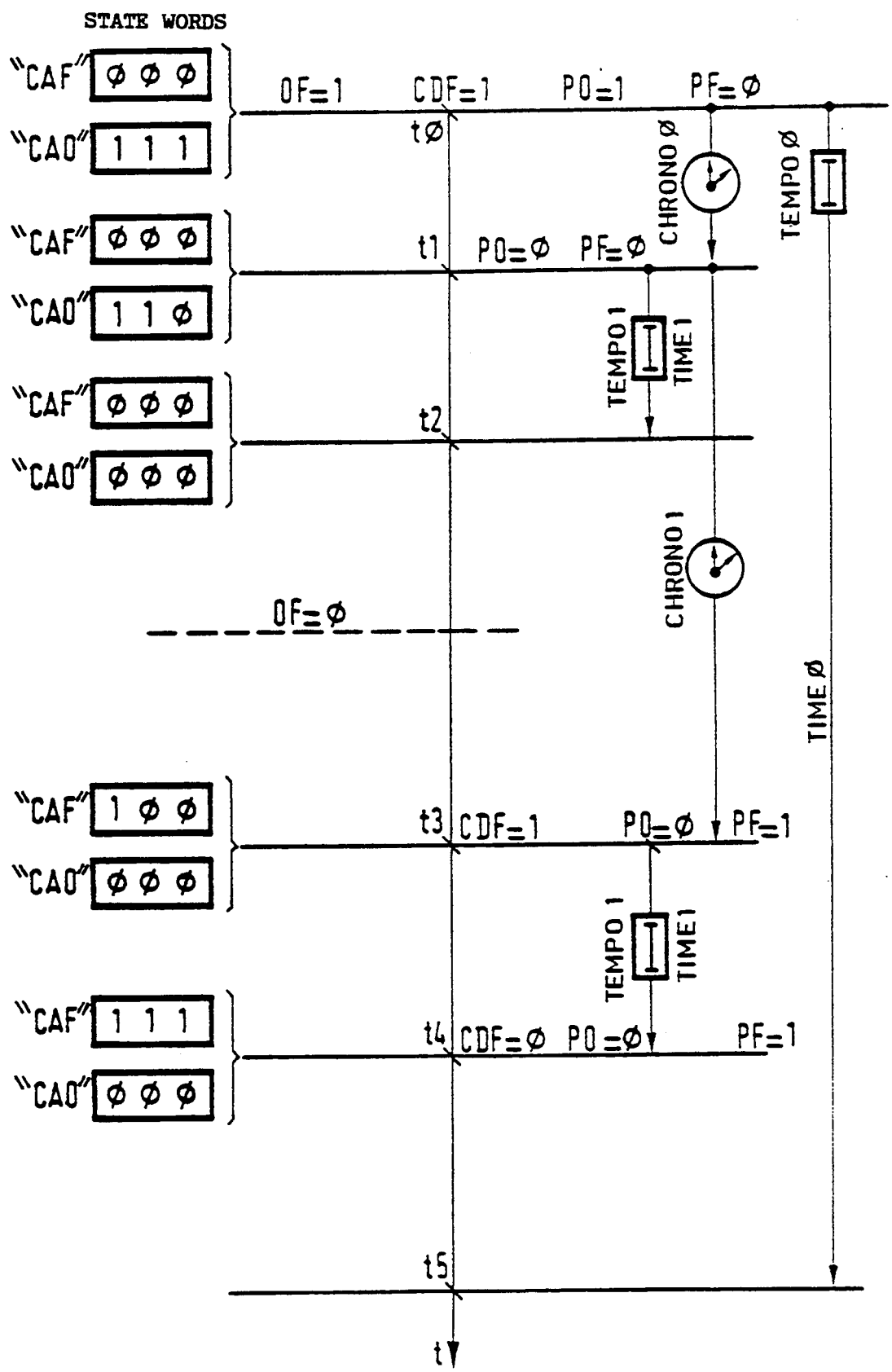
FIG. 2 is a diagram showing the normal closure sequence for one pole of a circuit breaker.

FIG. 2 is a diagram explaining the operation of the device during a pole-closing sequence. It is assumed that in the standby state preceding the open instruction OO, the pole was in good condition as were all of the auxiliary contacts CAO and CAF.

The example given applies to closing a pole, but the sequence described is identical, mutatis mutandis, for an operation of opening the pole from a closed state.

In the description below, when reference is made to time delay means or to timers, it will naturally be understood that these concepts relate to software processing.

The pole is thus assumed to be open to begin with, the CAO state word is 111 and the CAF state word is 000. At instant t0, when a close instruction OF is given to the pole and is stored, a first time delay TEMPO0 starts a first time window of given duration TIME0; simultaneously, a first timer CHRONO0 is started, and the command CDF giving the close instruction to the close coil is activated to "1", thereby initiating pole closure. Output PO is "1", and output "PF" is "0".

When the first CAO switches to "0" at an instant t1, a second time window of duration TIME1 is started by means of second time out TEMPO1. The second window is of duration TIME1 and the other CAOs are expected to switch to "0" during the second window. Simultaneously, the timer CHRONO0 is stopped and the first duration T1=t1−t0 is stored in memory, and a second timer CHRONO1 is started. At instant t2, the last of the CAOs is observed to switch to "0", after which their new status mask is stored. The timer TEMPO1 is stopped. If at the end of time delay TIME1, the other CAOs have not changed state, they are declared faulty and the corresponding bits of their status masks are zeroed.

The system waits for the first of the CAFs to switch from "0" to "1", and this occurs at instant t3. Timer CHRONO1 is stopped and its timed duration T2=t3−t1 is stored, which duration corresponds substantially to the stroke duration of the movable contact of the pole. By observing the way T1 and T2 change over time, precious information is obtained about proper operation of the apparatus, and makes it possible to plan maintenance. At the same instant t3, the time delay TEMPO1 is restarted so as to open a time window of duration TIME1, during which the other two CAFs are expected to switch. When the last of the CAFs does switch at time t4, the new status mask for the CAF is stored. The "pole closed" signal (PF=1) is issued. If at the end of said second window one or other of the CAFs has not changed state, then it is declared faulty, and the corresponding bit of its new status mask is reset to "0". Simultaneously, the CDF command is put to "0". In addition, if at the end of the time window TIME0 the signal contacts of a group have not changed state, then the group is taken to be subject to a major fault (a "1" signal on the MFCA output of the microcontroller), assuming that at least one CA of the other group has changed state appropriately.

After analyzing the status masks of the two groups of signal contacts and after detecting any major faults, at instant t5 corresponding to the end of time window TIME0 provided by the time delay TEMPO0, the microprocessor issues signals concerning the availability of the CAs on its outputs MACAO, MACAF, and MFCA, and also possibly concerning a major failure of the pole on its output MFP. It may be observed that if all of CAs are faulty, it is at instant t5 that the command CDF (in the event of a pole being closed) or CDO (in the event of the pole being opened) is returned to "0" in order to avoid the control coils being destroyed by the joule effect.

It will be observed that the sequence described above makes it possible to obtain precious information suitable for use in self-diagnosis of the pole: by knowing the time durations T1 and T2 it is possible over a number of operations to monitor the operating state of the pole and forestall failure thereof. In practice, the microprocessor stores the durations that correspond to the two most recently-performed operations, thereby making it possible, in particular, subsequently to observe any drift that may be occurring in said operating times.

The fault mode subprogram treats anomalies detected during the standby state (total failure of one or other of the CAF or CAO groups) or detected while performing an open or a close instruction, and characterized by an auxiliary contact failing to change state within the time delay TIME0 that is initiated on receiving an instruction.

The "fault mode" Subprogram is subdivided into a plurality of routines.

"Fault mode 1" routine deals with situations that relate to major faults appearing in the auxiliary contact groups during an operation. These major faults appear at the end of the time delay TIME0. The rules applicable under such circumstances are recalled:

Opening operation

Case 1: the operation began properly because at least one of the CAFs is observed to change state. The major failure is due to all three CAOs. Under such circumstances, if all three CAFs have changed state, it is possible to give a "pole open" signal with very little risk. It may be observed that the time duration T2 cannot be measured and is therefore given the value of TIME0.

Case 2: operation did not start.

The major fault is due to all three CAFs being broken down. If all three CAOs are good an have changed state it may be assumed that the pole is indeed open. If three good CAOs are not observed to change state, then the pole has failed and a signal is given saying the pole is neither open nor closed and all further instructions are locked out until the pole is repaired. (CDO="0" and CDF="0".) It may be observed that the time T1 is theoretically infinite since the process was never initialized. T1 is given a value corresponding to the maximum time value (FFFF) of the timer, and T2 is given the value of TIME0, which is an excess value, for want of any better value.

Closure operation

Case 1: the operation starts properly, since at least one of the CAOs is observed to change state. A major failure is thus due to a major failure of the CAFs. Since the probability of a mechanical failure of the pole is low, it is assumed that the pole has indeed closed. As before, T2 is taken to be equal to TIME0.

Case 2: the operation has not started. This may be due either to a major failure of all three CAOs, or else to a failure of the pole. Under such circumstances, if at least one good CAF is observed to change state, it may be assumed that the pole has closed. Otherwise, it is assumed that the pole is faulty and a controlled re-opening strategy is triggered by fault mode routine 3 as described below. The pole is said to be neither open nor closed. T1 is taken to be equal to FFFF and T2 is equal to be equal to TIME0.

The routine "fault mode 2" attempts to determine the position during the standby state while all of the CAOs and/or of the CAFs are faulty. If this cannot be done, no pole position is given and all subsequent pole operations are prevented.

Three cases must be distinguished:

Case No. 1: the instruction stored in memory bit 00 is "1" which means that the pole is open. For personnel safety, this open position of the pole is confirmed only if all of the signal contacts in at least one of the groups (either all of the CAOs or else all of the CAFs) are good.

Case No. 2: the instruction stored in memory bit 00 is "0". That means that the last instruction given was a close instruction. It is assumed that the pole is closed if at least one good CAF is at "1" or if at least one good CAO is at "0".

Case No. 3: all of the CAOs and all of the CAFs are faulty. The pole is declared to be faulty. No position is given and all subsequent operations are prevented.

The "fault mode 3" routine deals with pole failure. Pole failure may be detected during an operation or while in the standby state. In any event neither a pole open nor a pole closed signal is given and any subsequent operation of the pole is prevented by issuing signals on the outputs CDO and CDF which correspond to the control coils being locked.

If pole failure occurs on a close instruction, the microprocessor will attempt to open the pole during a period equal to TIME0, in order to try to reopen the pole and avoid leaving it in an intermediate position since the dielectric strength between its contacts is reduced if it remains in an intermediate position. If an arc were to be struck between the contacts of the circuit breaker, the effects thereof would be destructive.

If pole failure is detected during the standby state, nothing is done other than providing the locking and the signals mentioned above.

Naturally, the strategies described above are given purely by way of example. The strategies described under severe fault conditions may differ depending on the degree of risk that an operator is willing to accept in the event of such signals appearing. In the open state, the signals may be further reinforced by requiring n of the auxiliary contacts in a group to be good and at least one good auxiliary contact in the opposite group. In contrast, if continuity of service is of overriding importance, then the criteria for giving a pole open signal can be relaxed. These strategies are thus examples of what can be done using the concept of a programmed system in association with auxiliary contacts.

The apparatus of the invention provides a major contribution to developing self-monitoring stations and remote surveillance because of operating safety being provided by acquiring data that is precious for setting up active maintenance of the apparatus.

The invention is not limited to heavy current applications, an in the example that has been given. It applies to any field of industry, and it can be implemented whenever there is a need to determine the state of an apparatus or a machine as a function of a strategy that combines both continuity of service and safety of equipment and of personnel, and as a function of information provided by sensors that may themselves give wrong information in the event of failure.

I claim:

1. A device for determining the state of apparatus capable of existing in a first state and a second state, the apparatus being provided with auxiliary contacts providing binary state signals depending on the current state of the apparatus, the device being characterized in that it comprises at least one "first state" auxiliary contact providing a "1" state signal when the apparatus is in a first state, and at least one "second state" auxiliary contact providing a "1" state signal when the apparatus is in a second state, and a programmed microcontroller receiving said "1" state signals from the auxiliary contacts on inputs of said programmed microcontroller, and also receiving instructions requesting the apparatus to switch from one state to the other, and providing an output signal representative of at least one of the state and the availability of the apparatus, said output signal being generated by a software program for implementing a strategy for obtaining continuity of service and utilization safety for the apparatus, the software program relying on the following conditions:

if an auxiliary contact changes state without a state changing instruction being issued by the microcontroller, then the microcontroller considers that the auxiliary contact is faulty and no longer takes its signals into account; and if after a change of state instruction has been issued by the microcontroller an auxiliary contact does not change state in a given time delay, then the microcontroller considers the auxiliary contact to be faulty and does not take signals from the auxiliary contact into account;

the software program also stores the states of properly functioning auxiliary contacts in a memory as they appear at the instant when a change of state instruction is issued, and stores the change of state instruction in the memory.

2. A device according to claim 1, characterized in that the auxiliary contacts (CAO1, CAO2, CAO3, CAF1, CAF2, CAF3) are provided with self-diagnosis means and provide signals (ADO1, ADO2, ADO3, ADF1, ADF2, ADF3) addressed to inputs of the microcontroller.

3. A device according to claim 1, characterized in that the program is organized to lock the apparatus in an the "apparatus open" position and to issue an "apparatus faulty" signal whenever the state of the auxiliary contacts corresponds to none of the circumstances allowing it to issue an "apparatus open" signal.

4. A device for determining the position of an electrical cutout apparatus including a circuit breaker or a section switch having one pole per phase, and including for each of said poles auxiliary contacts that provide digital binary signals, said auxiliary contacts providing a "1" signal as a digital binary signal when the auxiliary contact is in a position that corresponds to the apparatus being in an open state or in a closed state, and a "0" signal as a digital binary signal when the auxiliary contact leaves its position, said pole being driven via an open coil and a close coil, the device being characterized in that for each pole it comprises a first group and a second group each of n auxiliary contacts, where n is an integer of not less than 2, the auxiliary contacts of the first group being "open auxiliary contacts" (CAO1, CAO2, CAO3) and providing a "1" signal when they detect the apparatus to be in an open position, the auxiliary contacts of the second group being "closed auxiliary contacts" (CAF1, CAF2, CAF3) and providing a "1" signal when they detect the apparatus to be in a closed position, the auxiliary contacts being connected to a programmed microprocessor (MP) that also receives a signal (OO) corresponding to an open instruction for the apparatus, and a signal (OF) corresponding to a close instruction for the apparatus, said microprocessor having an output (CDO) for controlling the open coil of the pole, an output (CDF) for controlling the close coil of the pole, an output (PF) providing an "apparatus closed" signal, an output (PO) for providing an "apparatus open" signal, outputs (MACAO, MACAF) for providing signals concerning the availability of the auxiliary contacts in the first and second groups, an output (MFCA) for providing a signal indicating a major fault in one of the auxiliary contact groups, and an output (MFP) for providing a signal indicating a major failure of the pole, the strategy of a program being established so that:

an auxiliary contact which does not change state within a given time delay following an open or a close instruction is considered as being faulty and is no longer taken into consideration by the program;

an apparatus is declared to be opened at the end of an open sequence if one of the following situations occurs at the end of said opening sequence:

all n closed auxiliary contacts and all n open auxiliary contacts are properly functioning and have changed state appropriately, with open auxiliary contacts changing from "1" to "0" and closed auxiliary contacts changing from "0" to "1";

at least one closed auxiliary contact is properly functioning and at least one open auxiliary contact has changed state appropriately;

all n properly functioning open auxiliary contacts have changed state while the n closed auxiliary contacts are all faulty (a major auxiliary contact failure corresponding to a signal MCFA =1 being issued); and all n properly functioning closed auxiliary contacts have changed state while the n open auxiliary contacts are all faulty (a major auxiliary contact failure corresponding to a signal MCFA=1 being issued);

an apparatus is declared to be closed at the end of the close sequence if one of the following circumstances arises at the end of said close sequence:

at least one properly functioning open auxiliary contact has changed state in the event of all of the closed auxiliary contacts failing during the operation; and at least one properly functioning closed auxiliary contact has changed state in the event of all of the open auxiliary contacts failing during the operation;

the program also being organized so that:

a group of contacts is declared faulty (a major auxiliary contact group failure corresponding to an MFCA=1 signal) if none of the auxiliary contacts of the group has changed state during a first time delay (TIME0) following an instruction to open or close the apparatus, and while during the same time lapse an appropriate change is observed for the auxiliary contacts of the other group; and an auxiliary contact is declared faulty if it has not changed state at the end of a second time delay (TIME1), initiated by another auxiliary contact of the same group changing state appropriately during an open sequence or a close sequence of the apparatus.

5. A device according to claim 4, characterized in that the program is organized so that in a standby state, an "apparatus open" signal is given when one of the following circumstances arises:

the n open auxiliary contacts are properly functioning and in the "1" state and the n closed auxiliary contacts are properly functioning and in the "0" state;

at least one open auxiliary contact is properly functioning and in the "1" state and at least one closed auxiliary contact is properly functioning an in the "0" state;

the n open auxiliary contacts are properly functioning and in the "1" state if all of the closed auxiliary contacts are faulty; and the n closed auxiliary contacts are properly functioning and in the "0" state if all the closed auxiliary contacts are faulty;

wherein, the auxiliary contacts are provided with self-diagnosis means and provide signals (ADO1, ADO2, ADO3, ADF1, ADF2, ADF3) addressed to inputs of the microcontroller.

6. A device according to claim 4, characterized in that the program is organized so that in a standby state, an "apparatus open" signal is given when one of the following circumstances arises:

the n open auxiliary contacts are properly functioning and in the "1" state and the n closed auxiliary contacts are properly functioning and in the "0" state;

at least one open auxiliary contact is properly functioning and in the "1" state and at least one closed auxiliary contact is properly functioning and in the "0" state;

the n open auxiliary contacts are properly functioning and in the "1" state if all of the closed auxiliary contacts are faulty; and the n closed auxiliary contacts are properly functioning and in the "0" state if all the closed auxiliary contacts are faulty.

7. A device according claim 4, characterized in that the program is organized so that in a standby state, an "apparatus closed" signal is issued so long as one of the following circumstances is present;

at least one closed auxiliary contact is properly functioning and in the "1" state; and at least one of the open auxiliary contacts is properly functioning and in the "0" state.

8. A device according to claim 4, characterized in that the program is organized to lock the apparatus in an "apparatus closed" position and to issue a "apparatus faulty" signal whenever the state of the auxiliary contacts corresponds to none of the circumstances enabling it to issue an "apparatus closed" signal.

9. A device according to claim 4, characterized in that the program is organized in such a manner that:

when an open or a close instruction (OO, OF) is given at a time origin (t0), a first surveillance time window having a first duration (TIME0) is initiated by a first time delay (TEMPO1), and simultaneously a first timer (CHRO0) is started;

when the first of the auxiliary contacts of a first group changes state (an open auxiliary contact for an open instruction or a closed auxiliary contact for a close instruction) at an instant t1, a second time window having a second duration (TIME1) is opened by means of a second time delay (TEMPO1) and simultaneously the first timer (CHRO0) is stopped, the time provided by the first timer is stored in a memory, which time corresponds to the starting time from rest, and a second timer (CHR1) is started;

at the end of the second time duration (TIME1), at instant t2, the auxiliary contacts of said first group have had the chance to change state, and the resulting states thereof are stored in the memory in order to be analyzed;

when the first of the auxiliary contacts of the second group changes state at instant t3, said second time window of the second duration (TIME1) is started again using said second time delay (TEMPO1) and simultaneously the second timer (CHR1) is stopped and the time provided by the second timer is stored in the memory and is suitable for use in determining the mean speed of the contacts of the equipment;

when the second time delay expires (TIME1), all of the properly functioning auxiliary contacts in the second group will have changed state, and the resulting states are stored in the memory in order to be analyzed;

an auxiliary contact in the first group or in the second group is declared to be faulty if the auxiliary contact has not changed state at the end of the second time window (TIME1) relating thereto; and a group of auxiliary contacts is declared to be suffering from a major fault if none of the auxiliary contacts in the group has changed state by the end of the first time window (TIME0) when an appropriate change of state has been observed in the other group.

10. Amended) A device according to claim 4, characterized in that the program includes a first fault mode subprogram (fault mode 1) which:

during an apparatus opening process, after observing that the sequence has been initiated by a change in the state of a closed auxiliary contact and that none of the open auxiliary contacts has changed state at the end of a first time window (TIME0), causes an apparatus fault signal (MFP=1) to appear;

during an apparatus opening process, after observing that the sequence has not been initiated because none of the closed auxiliary contacts has changed state at the end of the first time window, causes an "apparatus open" signal (PO=1) to appear if all open auxiliary contacts have not changed state, and simultaneously issues a major fault signal concerning the closed auxiliary contacts (MACAF=1, MFCA=1);

during an apparatus opening process, after observing that the sequence has not been initiated because none of the closed auxiliary contacts has changed state at the end of the first time window, and having observed no change of state in the properly functioning open auxiliary contacts, causes an apparatus failure signal (MFP=1) to appear and locks out any subsequent instruction;

during an apparatus closing process, after observing that the sequence has been initiated by an open auxiliary contact changing state and observing that none of the closed auxiliary contacts has changed state at the end of the first time window (TIME0) having a first duration, causes an "apparatus closed" signal to appear, with a second time window having a second duration being taken to be equal to the first duration during an apparatus closing process, after observing a major fault of the closed auxiliary contacts, causes an "apparatus closed" signal to appear if one of the open auxiliary contacts changes state;

during an apparatus closing process, after observing a major fault of the closed auxiliary contacts, and after observing that none of the properly functioning open auxiliary contacts has changed state, declares the apparatus to be faulty, takes the first duration (T1) to be equal to the duration of the first time window (TIME0), takes the second duration (T2) to be equal to the maximum time value capacity of a timer (FFFF), and causes a fault mode program (fault mode 3) to be run.

11. A device according to claim 4, characterized in that the program includes a fault mode subprogram (fault mode 2) for determining the position of the apparatus in a standby state when all of the open auxiliary contacts and/or all of the closed auxiliary contacts are faulty, said second subprogram being organized so that:

the last recorded given instruction being an open instruction, the device confirms the "apparatus open" state only if all of the auxiliary contacts in one of the groups are properly functioning;

the last recorded given instruction being a close instruction, the device indicates that the apparatus is closed if at least one properly functioning closed auxiliary contact is in the "1" state or if at least one properly functioning open auxiliary contact is in the "0" state; and if all of the open auxiliary contacts and all of the closed auxiliary contacts are faulty, the device indicates that the apparatus is faulty and prevents any subsequent operation thereof.

12. A device according to claim 4, characterized in that the program includes a third fault mode subprogram (fault mode 3) for detecting faults of the apparatus and for locking out all subsequent instructions, and for issuing a "apparatus faulty" signal.

13. A device according to claim 4, characterized in that the number n of auxiliary contacts in each group is equal to 3.

* * * * *